R. R. LAWRENCE.
ROTARY PHASE CONVERTER SYSTEM.
APPLICATION FILED JULY 31, 1916.

1,249,783.

Patented Dec. 11, 1917.

Inventor:
Ralph R. Lawrence,
by Roberts Roberts & Cushman
Attys.

UNITED STATES PATENT OFFICE.

RALPH R. LAWRENCE, OF DORCHESTER, MASSACHUSETTS, ASSIGNOR TO WESTINGHOUSE ELECTRIC & MANUFACTURING COMPANY, A CORPORATION OF PENNSYLVANIA.

ROTARY-PHASE-CONVERTER SYSTEM.

1,249,783.  Specification of Letters Patent.  Patented Dec. 11, 1917.

Application filed July 31, 1916. Serial No. 112,220.

*To all whom it may concern:*

Be it known that I, RALPH R. LAWRENCE, citizen of the United States, and resident of Dorchester, in the county of Suffolk and State of Massachusetts, have invented new and useful Improvements in Rotary-Phase-Converter Systems, (Case B,) of which the following is a specification.

This system relates to a system of converting current of one phase into current of a different phase, and more particularly the invention relates to means for maintaining, in a polyphase circuit connected with a phase converter, proper phase relations and voltage conditions throughout wide range in variation of load. In the preferable form the invention comprises a single-phase circuit, a three-phase circuit, a rotary phase converter connected therebetween, and a series excited generator associated with the branches of the three-phase circuit in such a way as to maintain proper phase displacements and voltages in the three-phase circuit throughout variation in load. However, it is not to be understood that my invention is limited to single-phase and three-phase systems, but it is to be understood that the invention is applicable to systems for converting current of any particular phase into current of any other desired phase.

It has been found desirable, for many purposes, to generate current of one phase and to convert the current so generated, either at the generating station or at a distant point, into current of a different phase, and sundry systems comprising special transformer arrangements or rotary phase converters have been designed to attain this end. One of the most satisfactory systems for the purpose is that illustrated and described in an article published by the Westinghouse Electric & Mfg. Co. of Pittsburg, Pa., in the *Electric Journal*, Vol. XII, No. 6, June 1915, pp. 261-264. Systems of this type, however, possess the inherent disadvantage of disturbing the phase relation and the relative magnitude of the voltages and currents of the respective phases of the polyphase circuit to such an extent that they are impractical where normal phase relations and voltage conditions are important factors unless special means is provided to balance the system. One means of compensating for the tendency to disturb the voltage conditions is described in the article above referred to, but it is desirable to compensate for undue disturbance of the phase relations as well as for the disturbance of the voltages. Furthermore, it is desirable to maintain proper phase relations and voltage conditions not only at one particular load, such as full load or three-quarter load, but throughout the entire range of loads.

The principal object of my invention, therefore, is to provide means for maintaining throughout variation in load, proper phase relations and voltage conditions in a polyphase circuit receiving current from, or supplying current to, a phase converter. This object is attained, in general, by a source of power connected to the converter side of a system for producing in one or more of the branches of the polyphase circuit a voltage which is opposed to the drop in voltage due to the apparent resistance and the apparent reactance of the rotary converter whereby as the load varies and as the voltage drop in the converter varies with the load, the voltage produced by the generator varies in proportion to the voltage drop in the converter and maintains the phase relations and voltage conditions substantially constant throughout variation in load.

Other objects of the invention will be apparent from the following detailed description and accompanying drawings, in which—

T is an ordinary single-phase transformer, RC is a rotary phase converter, and G is a series excited generator which may be of any approved type, but which is here shown as of the compensated commutator type. The left hand winding of the transformer may be connected to a single-phase circuit and the three right hand leads $L_a$, $L_b$, $L_c$ comprise the three branches of a three-phase circuit which may be connected either to the source of power or to the load, depending upon whether the system is to be used to convert three-phase current into single-phase current or vice versa. The rotary phase converter RC preferably comprises an ordinary induction motor having two sets of windings $w$ and $w'$ on the stator S, and having a rotor R of either the squirrel cage type, as indicated, or other suitable type. The stator is shown as being of the Gramme ring type merely for convenience of illustration, and in practice would, of course, be of suitable modern construction. One set $w$ of the converter windings is connected across the transformer, and the other set $w'$ is connected to an intermediate point, preferably the middle point of the transformer, the two sets of windings being wound in 90-degree phase relation with each other.

An essential feature of the system is that the voltage generated by the phase converter and delivered to the three-phase circuit be substantially 86.6 per cent. of the voltage directly delivered by the transformer to the three-phase circuit when converting single-phase current to three-phase current. Inasmuch as the windings $w$ function as motor windings and the windings $w'$ function as generator windings, this voltage condition can be attained in either of the following ways: The windings $w$ may be connected directly across the transformer secondary and the windings $w'$ have 86.6 per cent. of the turns of the windings $w$, as indicated in Fig. 1; or, as indicated in Fig. 2, the windings $w$ may be connected to points displaced inwardly from the ends of the transformer secondary such distances that the voltage supplied to the windings $w$ is only 86.6 per cent. of the voltage across the transformer, in which event the turns of windings $w'$ are equal in number to the turns of windings $w$.

Figure 1:
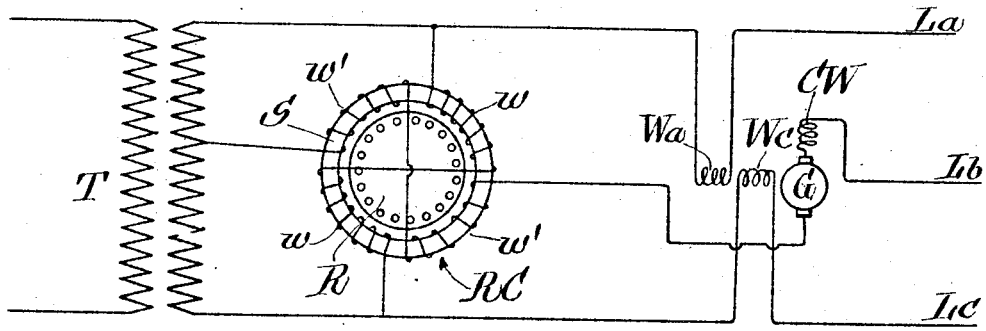
Figure 1 is a circuit diagram illustrating one embodiment of my invention.

The generator G is shown in Fig. 1 as being of the compensated commutator type comprising a compensating winding CW connected in series with the armature in lead $L_b$ and having exciting windings $W_a$, $W_c$ connected respectively in leads $L_a$, $L_c$ in such a manner that the magnetomotive forces produced by these two windings are in 60-degree time-phase relationship with each other. The windings CW, $w_a$ and $w_c$ are wound on the stator so that the compensating winding CW is in alinement with the magnetic axis of the armature and displaced 90 electrical degrees from the axis of the field produced by windings $w_a$ and $w_c$.

Figure 2:
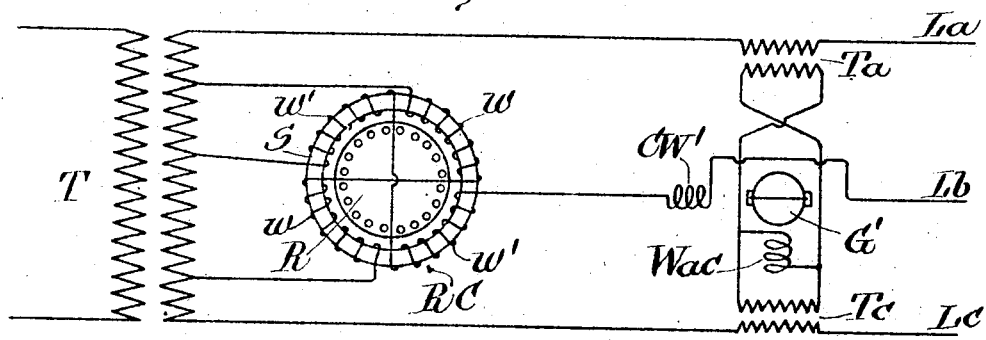
Fig. 2 is a circuit diagram illustrating another embodiment of my invention.

The generator G' shown in Fig. 2 comprises a type different from that shown in Fig. 1 and has its field winding connected to the leads $L_a$, $L_c$, inductively instead of conductively. The generator G' is of the so-called "transformer type" and comprises a short-circuited armature, a compensating winding CW' connected in series with the lead $L_b$ for compensating the reactance drop in the generator, and a single exciting winding $W_{ac}$, which is inductively connected to the leads $L_a$, $L_c$, by means of transformers $T_a$ and $T_c$ in such a manner that the resultant magnetomotive force impressed on the field is proportional to the vector sum of the currents derived from the two leads $L_a$, $L_c$, displaced 60-degrees in phase relationship with respect to each other. The compensating winding in Fig. 2 is positioned with relation to the armature as in Fig. 1, but that it is only inductively related to the armature and not conductively connected therewith. This type of generator having the compensating winding only inductively related to the armature, gives better commutation than does the type of generator shown in Fig. 1.

The two types of generator illustrated in Figs. 1 and 2 are only two examples of voltage producing apparatus comprising the subject matter of my invention in its generic aspect, there being other types of apparatus which will produce the desired result, the cardinal factor being the generation of a voltage in time-phase opposition to, and approximately proportional to, the apparent reactance drop in the phase converter.

Inasmuch as the voltage produced by a generator of the commutator type, illustrated, is in time-phase relation with, and approximately proportional to, the field excitation of the generator, the desired result may be attained by connecting the field coils in the outside windings $L_a$, $L_c$, in such a manner that the resultant magnetomotive force produced by the currents in these two lines in the field of the generator is approximately proportional to and in 90-degree time-phase relationship with the current in line $L_b$. The generator must be connected in the line $L_b$ in such direction that the voltage generated thereby in line $L_b$ will be in direct opposition to the apparent reactance drop produced in $L_b$ by the phase converter RC. By adjusting the excitation and other variable factors of the generator this voltage produced by the generator can be made substantially equal to as well as opposite to the reactance drop of the rotary converter throughout variation in load.

Figure 3:
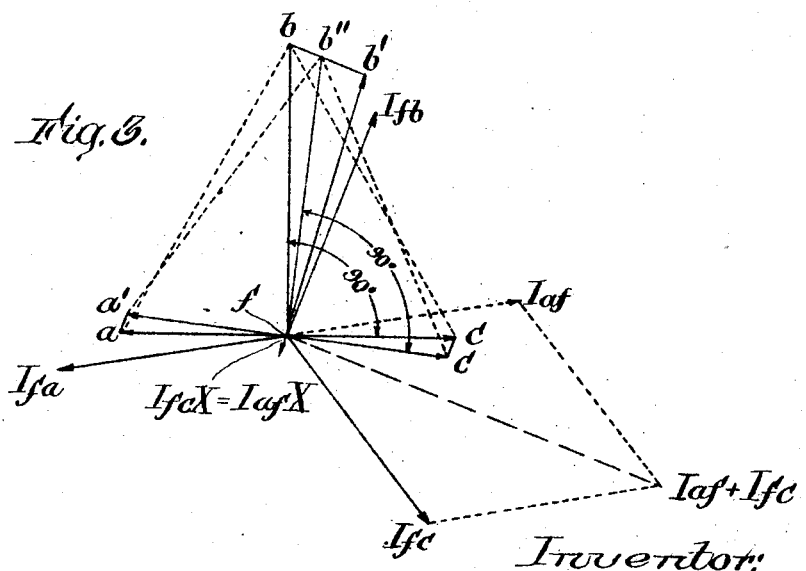
Fig. 3 is a vector diagram illustrating the theory of operation of the various embodiments of the system.

When converting single-phase current into three-phase current, or vice versa, the voltage relations in the three-phase circuit are as indicated in Fig. 3, wherein $ac$ represents the single-phase electromotive force delivered from the transformer and $fb$ represents the electromotive force generated by the winding $w'$ of the phase converter at no load, the latter being 86.6 per cent. of the former. Thus, with $fb$ at right angles to $ac$ the voltages between the three-phase leads represented by $ab$, $bc$ and $ca$, respectively, are equal in magnitude and properly displaced in phase relationship with respect to each other, that is, uniformly displaced in phase 120 degrees from each other. This is the no-load condition either with or without the series generator. However, in the absence of the generator or other balancing means, this symmetrical no-load condition becomes unbalanced as soon as a load is applied, and as the load increases the unbalanced condition rapidly increases, due to the change in the quadrature field with load and to the impedance drop in the windings of the converter. Since one set of windings of the converter acts as a motor while the other set acts as a generator, the impedance drops cannot produce the same effect in the terminal voltage of each phase. For example, $fb'$, which represents the electromotive force produced across the terminals of windings $w'$ when the system is loaded, is both reduced in value and shifted in phase relation to the electromotive force $ac$ across the transformer circuit.

By employing a generator connected in the three-phase circuit as shown in Figs. 1 and 2, for example, so that the magnetomotive force impressed upon the field of the generator is approximately proportional to and in 90-degree time-phase relationship with the current in line $L_b$, a voltage is generated in lead $L_b$ approximately proportional to and in time-phase relationship with the field excitation. As indicated in Fig. 3, where in $bb'$ represents the drop in voltage under load due to the converter, $b'b''$ represents the voltage added by the generator, $cc'$ represents the voltage induced in the field winding $W_c$ of the generator due to the flux in the field core; $aa'$ represents the voltage induced in the field winding $W_a$ of the generator due to the flux in the field core, and $a'b''$, $b''c'$ and $c'a'$ represent the balanced three-phase voltages under load. The voltages $b'b''$ added by the generator is in opposition to the voltage drop $bb'$ of the converter, and of proper magnitude to maintain the desired 90-degree relationship between the voltage $fb''$ and the voltage $a'c'$ across the leads $L_a$, $L_c$ under load.

The resistance drops are neglected in Fig. 3 in order to simplify the diagram and the three-phase currents under load which are assumed to be equal and 120 degrees apart are represented by the vectors $I_{fb}$, $I_{fc}$ and $I_{fa}$. The resultant magnetomotive force produced by the field windings of the generator is proportional to the sum of the currents $I_{fc}$ and $I_{af}$ flowing in the leads $L_a$, $L_c$, and, inasmuch as the flux in the field of the generator is approximately in time-phase with the resultant magnetomotive force, it produces a voltage in each of the leads $L_a$, $L_b$, 90 degrees behind it, as indicated by $I_{fc}X$ and $I_{af}X$. The reactance voltage $I_{fc}X$ added to the voltage $fc$ gives the voltage $fc'$, and $I_{fa}X$ (which is equal to $-I_{af}X$) added to the voltage $fa$ gives the voltage $fa'$. The voltages $I_{fc}X$ and $I_{fa}X$ each appear in 90-degree time-phase relation with the reactance voltage $bb'$ in the converter, and when load is applied rotate the voltage $ac$ to a new position $a'c'$. This fact is taken into consideration in designing the generator so that the voltage produced by the generator $b'b''$ will not be equal to the voltage drop in the converter $b'b$ but will be of somewhat smaller magnitude, whereby the voltage $fb''$ is in a 90-degree time-phase relationship with $a'c'$. Furthermore, the generator is so designed that the voltages $I_{af}X$ and $I_{fc}X$ are as small as possible inasmuch as the power factor of the system is somewhat improved by maintaining these reactance voltages small.

In the above description, the resistance drops have been neglected, but the effect of these is very small. However, ignoring the negligible resistance and leakage reactance drop in the armature and compensating winding of the generator, the resistance drops can be balanced under balanced current loads by making the ratio of the resistance drop to the reactance drop in the excited windings of the generator field the equal to the ratio of the total apparent resistance drop to the total apparent reactance drop in the converter.

In the claims I recite that the field winding or windings of the generator are "connected" to certain of the circuits. By this it is to be understood that I mean either directly connected, as in Fig. 1, or indirectly connected through the medium of an inductive coupling, as in Fig. 2, and the expression "series excited generator" employed throughout the specification and claims is not to be understood to mean that the exciting windings are connected directly in series with the armature as in the ordinary series generators, but on the other hand the expression is to be understood to mean that the windings are connected, either conductively or inductively, in series with one or more of the branches of the polyphase circuit.

I claim:

1. A balanced phase converter system comprising a phase converter, a circuit for supplying current of one phase to the converter, a circuit for delivering current of a different phase to the load, one of the circuits comprising three or more branches, a generator for supplying current to one branch in synchronism with the power therein, the generator having its field windings mutually inductively related and respectively connected to a plurality of the other branches for producing in the field of the generator a magnetomotive force approximately proportional to and in quadrature with the current in the generator branch.

2. A balanced phase converter system comprising a single-phase circuit, a three-phase circuit, means between the circuits for converting current of one phase into current of the other phase, and a generator connected to one branch of the three-phase circuit, the generator having mutually inductively related field windings connected to a plurality of the branches of the three-phase circuit in 60-degree time-phase relationship, whereby the voltages between the branches are balanced throughout variation in load.

3. A balanced phase converter system comprising a phase converter, a single-phase circuit and a three-phase circuit connected therewith, the phase converter being connected in one branch of the three-phase circuit and arranged to generate a voltage in quadrature with the single-phase voltage, and a generator for producing a voltage in the converter branch of the three-phase circuit in synchronism with the three-phase voltage, the field winding of the generator being mutually inductively interlinked and serially related to the other branches of the three-phase circuit to produce in the field of the generator a magnetomotive force approximately proportional to and in quadrature with the current in the converter branch.

4. A phase-converting system comprising a source of single-phase alternating current, a three-phase load circuit, a phase converter, connections from two mains of said load circuit directly to said source, a connection from the third main of said load circuit to said source through said phase-converter, means for inductively transferring energy from one of said directly connected mains to the other and means for producing an electromotive force in said third main substantially equal and opposite to the effect of the machine ohmic and inductive drops on the electromotive force thereof.

5. A phase-converting system comprising a source of single-phase alternating current, a three-phase load circuit, a phase converter, connections from two mains of said load circuit directly to said source, a connection from the third main of said load circuit to said source through said phase-converter, two inductively interlinked windings connected respectively in said two directly connected mains and so arranged that a 60° phase relationship exists between their magnetomotive forces and means for producing a rotational electromotive force by cutting the resultant flux of said windings and for injecting said electromotive force into said third main in such direction as to oppose the effect of the ohmic and inductive drops of the system on the potential of said third main.

Signed by me at Boston, Massachusetts this 27th day of July, 1916.

RALPH R. LAWRENCE.

Copies of this patent may be obtained for five cents each, by addressing the "Commissioner of Patents. Washington, D. C."